United States Patent
Lee

(10) Patent No.: US 10,158,984 B2
(45) Date of Patent: Dec. 18, 2018

(54) SYSTEM AND METHOD FOR COLLECTING USAGE HISTORY OF SMARTPHONE, RECOMMENDING USER FITTING APPLICATION, AND PROVIDING RESEARCH SERVICE BASED ON REWARD USING SMARTPHONE OPTIMIZING APPLICATION

(71) Applicant: NAVER Corporation, Seongnam-si (KR)

(72) Inventor: YungSeong Lee, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 14/837,614

(22) Filed: Aug. 27, 2015

(65) Prior Publication Data

US 2016/0066120 A1 Mar. 3, 2016

(30) Foreign Application Priority Data

Aug. 29, 2014 (KR) ........................ 10-2014-0113861

(51) Int. Cl.
*H04W 4/60* (2018.01)
*H04L 29/08* (2006.01)
(Continued)

(52) U.S. Cl.
CPC .......... *H04W 4/60* (2018.02); *G06Q 30/0203* (2013.01); *G06Q 30/0255* (2013.01);
(Continued)

(58) Field of Classification Search
CPC ............. H04M 15/00; H04M 15/8083; H04M 2215/0152; H04M 15/58; H04M 1/72563; H04M 2215/0192; H04L 67/22; G06Q 30/0255; H04W 4/60; H04W 4/24; G04M 1/72525
(Continued)

(56) References Cited

U.S. PATENT DOCUMENTS

| | | | |
|---|---|---|---|
| 6,701,441 B1* | 3/2004 | Balasubramaniam | H04L 63/08 705/52 |
| 8,131,271 B2* | 3/2012 | Ramer | G06F 17/30749 455/414.1 |
| 2011/0028138 A1* | 2/2011 | Davies-Moore | G06F 3/04817 455/418 |

FOREIGN PATENT DOCUMENTS

| | | |
|---|---|---|
| KR | 10-2008-0099884 A | 11/2008 |
| KR | 10-2011-0040337 A | 4/2011 |

(Continued)

*Primary Examiner* — Huy C Ho

(74) *Attorney, Agent, or Firm* — Greer, Burns & Crain, Ltd.

(57) ABSTRACT

A service system and method for collecting usage history of a smartphone using a smartphone optimization application, recommending a user-fitting application, and providing a research service based on a reward, include a processor, and a memory. The processor includes a collector configured to collect usage history provided from a terminal according to a control of an optimization application that is installed in the terminal and automatically executed in the terminal for at least one of a security enhancement and performance optimization of the terminal, and an analyzer configured to analyze at least one of a field of interest of the user and a usage pattern of the user about at least one other application installed in the terminal, based on the collected usage history.

20 Claims, 10 Drawing Sheets

(51) Int. Cl.
 *G06Q 30/02* (2012.01)
 *H04M 15/00* (2006.01)
 *H04M 1/725* (2006.01)
 *H04W 4/24* (2018.01)

(52) U.S. Cl.
 CPC ........ *H04L 67/22* (2013.01); *H04M 1/72563* (2013.01); *H04M 15/58* (2013.01); *H04M 15/8083* (2013.01); *H04W 4/24* (2013.01); H04M 1/72525 (2013.01); H04M 2215/0192 (2013.01)

(58) Field of Classification Search
 USPC ....................................................... 455/408
 See application file for complete search history.

(56) References Cited

FOREIGN PATENT DOCUMENTS

| | | |
|---|---|---|
| KR | 10-1233955 B1 | 2/2013 |
| KR | 10-2013-0024345 A | 3/2013 |
| KR | 10-2013-0039498 A | 4/2013 |
| KR | 10-2013-0063083 A | 6/2013 |

\* cited by examiner

SYSTEM AND METHOD FOR COLLECTING USAGE HISTORY OF SMARTPHONE, RECOMMENDING USER FITTING APPLICATION, AND PROVIDING RESEARCH SERVICE BASED ON REWARD USING SMARTPHONE OPTIMIZING APPLICATION

CROSS-REFERENCE TO RELATED APPLICATION

This application claims priority from and the benefit of Korean Patent Application No. 10-2014-0113861, filed on Aug. 29, 2014, the disclosure of which is incorporated herein in its entirety by reference.

BACKGROUND

Field

Example embodiments of the present invention relate to a service system and method for collecting usage history of a smartphone using a smartphone optimization application, recommending a user-fitting application, and providing a research service based on a reward.

Description of the Background

In a smartphone, advantages of a mobile phone and a personal digital assistant (PDA) are combined. In detail, in the smartphone, functions of the mobile phone are combined with data communication functions such as a schedule management, a facsimile transmission/reception, and an Internet connection. While existing mobile phones have only functions allowed upon release as a complete product, a user may install, add, or delete various types of applications, for example, application programs.

The user may directly connect to the Internet using wireless Internet access, or may connect to the Internet using a variety of browsing programs. The user may directly create a desired application, and may configure an interface suitable for the user using various types of applications. Further, the user may share an application with another user having a smartphone equipped with a similar operating system (OS). The aforementioned advantages are not found in existing mobile phones.

An application store (Appstore) refers to an online 'mobile content (software) market' that allows trades of mobile applications. An application (hereinafter, an App) may be distributed through various paths. The user may install a desired App in the smartphone by searching for and selecting the desired App through the Appstore and by downloading an installation file.

The Appstore according to the related art recommends an App to the user based on download counts of the App, a correlation with an App previously downloaded by the user, reviews, and ratings. However, the download counts may be insignificant since 90% or more of Apps downloaded by users are downloaded once or less. The correlation between Apps is also insignificant with respect to an App that is not used. In addition, various abusing methods are known in association with the reviews or the ratings and thus, it is difficult to identify the review or the rating of a genuine user.

Also, from the view of App developers or App sellers, there is a need to verify an App that is being substantially used and a usage frequency of the App for each country and/or for each target user as well as given information. For example, when developing a new App, specific data may be required to determine a business value. However, the Appstore according to the related art provides only information about rankings for each App market or for each App or provides download rankings for each section. Accordingly, the App developers or the App sellers determine a business value at a level of using subjective data such as recollection-based answers of users through a separate survey.

SUMMARY

Some example embodiments of the present invention provide a system and a method that collect terminal usage history of a user using an optimization tool installed in a terminal of the user capable of installing and using an application (App), such as a smartphone.

Some example embodiments provide a system and a method that analyze an App frequently used by a user based on a circumstance by verifying quantitative information based on collected usage history and by verifying an App executed or used by the user based on time, place, and occasion.

Some example embodiments provide a system and a method that recommend another App to a user based on an App frequently that is used by the user based on a circumstance.

Some example embodiments provide a system and a method that provide a research service about terminal usage history of a user based on a reward.

According to at least one example embodiment, there is provided a service system including a processor, and a memory, wherein the processor includes a collector configured to collect usage history provided from a terminal according to a control of an optimization application that is installed in the terminal and automatically executed in the terminal for at least one of a security enhancement and a performance optimization of the terminal, and an analyzer configured to analyze at least one of a field of interest of the user and a usage pattern of the user about at least one other application installed in the terminal, based on the collected usage history.

The usage history may include information about at least one of a category of the at least one other application installed in the terminal, an execution time indicating a duration of time in which the at least one other application is executed in the terminal, execution counts indicating the number of times that the at least one other application is executed in the terminal, an execution time occupancy rate, and an execution count occupancy rate, and information about an application automatically executed in the background irrespective of an input of the user among the at least one other application.

The usage history may include information about content executed by executing, by the user, the at least one other application, and information about the content may be determined based on at least one of keyword analysis, image matching, and video matching with respect to information included in the content.

Information about the content may include at least one of information about content included in a site or a page connected through the at least one other application and information about a download page of the at least one other application or a page provided from a developer of the at least one other application.

The usage history may include at least one of information input from the user through a user interface provided from the at least one other application and information transferred to the terminal from a service server that provides a service to the at least one other application.

The service system may further include a recommender configured to determine another application that is to be installed in the terminal based on at least one of the field of interest of the user and the usage pattern, and to provide information about the another application to the terminal.

The analyzer may be further configured to generate information about usage a ranking of the at least one other application of the user based on at least one of an execution time, execution counts, an execution time occupancy rate, and an execution count occupancy rate of the at least one other application, and to analyze the usage pattern based on information about the usage rankings.

The analyzer may be further configured to analyze the field of interest of the user based on the type of the at least one other application and information about content executed by executing the at least one other application.

According to at least one example embodiment, there is provided a service system including a processor, and a memory, wherein the processor includes a receiver configured to receive an agreement of a user to join a research program provided from a terminal and input information of the user according to the control of an optimization application that is installed in the terminal and automatically executed in the terminal for at least one of security enhancement and performance optimization of the terminal, a collector configured to collect usage history about at least one other application installed in the terminal, the usage history provided from the terminal according to the control of the optimization application, and a reward provider configured to provide a reward to the user in response to receiving at least one of the agreement, the input information, and the usage history.

The receiver may be further configured to receive the agreement of the user and the input information of the user that are input through a user interface provided from the optimization application. The input information of the user may include information about at least one of age, gender, region, academic background, income, an owned vehicle, and residential environment, information about a field of interest of the user, and interaction information with a social network service (SNS) joined by the user.

The reward provider may be further configured to provide at least one of the first reward in response to receiving the agreement of the user and the input information of the user and the second reward in response to receiving the usage history.

The service system may further include a research information receiver configured to receive information about a research condition from a client that requests a research associated with an application usage of users, and a target user setter configured to set a target user corresponding to the research condition based on the usage history. The reward provider may be further configured to provide a reward to the user when the user is the target user corresponding to the research condition or when the usage history provided from the terminal of the user corresponds to the research condition.

The service system may further include a research information receiver configured to receive information about a research condition from a client that requests a research associated with an application usage of users, and a feedback requester configured to request the user of the terminal having installed an application corresponding to the research condition for feedback information about a usage of the application corresponding to the research condition. The reward provider may be further configured to provide a reward in response to receiving the feedback information.

The service system may further include a feedback receiver configured to receive the feedback information from the terminal, a verifier configured to verify an additional usage of the application corresponding to the research condition based on the usage history received from the terminal after receiving the feedback information, and a coordinator configured to determine an answer reliability about the feedback information of the user based on the received feedback information and the verified additional usage, and to coordinate a target user priority about the research request based on the determined answer reliability.

According to at least one example embodiment, there is provided a service system including a processor, and a memory, wherein the processor includes a collector configured to collect usage history provided from a terminal, an analyzer configured to analyze at least one of a field of interest of a user of the terminal and a usage pattern of at least one application installed in the terminal, and a recommender configured to determine another application that is to be installed in the terminal based on the field of interest of a user of the terminal and the usage pattern, and to provide information about the other application to the terminal.

The analyzer may be further configured to analyze the field of interest of the user based on information about content executed by executing the at least one application.

The usage history may include information about at least one of a category of the at least one application, an execution time indicating a duration of time in which the at least one application is executed in the terminal, execution counts indicating the number of times that the at least one application is executed in the terminal, execution time occupancy rate, and execution count occupancy rate, and information about an application automatically executed in the background irrespective of an input of the user among the at least one application.

The usage history may include information about content executed by executing, by the user, the at least one application, and information about the content may be determined based on at least one of keyword analysis, image matching, and video matching with respect to information included in the content.

Information about the content may include at least one of information about content included in a site or a page connected through the at least one application and information about a download page of the at least one application or a page provided from a developer of the at least one application.

The usage history may include at least one of information input from the user through a user interface provided from the at least one application and information transferred to the terminal from a service server that provides a service to the at least one application.

It is to be understood that both the foregoing general description and the following detailed description are explanatory and are intended to provide further explanation of the example embodiments as claimed.

According to at least one example embodiment, it is possible to collect terminal usage history of a user using an optimization tool installed in a terminal of the user capable of installing and using an App, such as a smartphone.

According to at least one example embodiment, it is possible to analyze an App frequently used by a user based on a circumstance by verifying quantitative information based on collected usage history and by verifying an App executed or used by the user based on time, place, and occasion.

According to at least one example embodiment, it is possible to recommend another App to a user based on an App that is frequently used by the user based on a circumstance.

According to at least one example embodiment, it is possible to provide a research service about terminal usage history of a user based on a reward.

BRIEF DESCRIPTION OF THE DRAWINGS

The foregoing and other features of the example embodiments will be apparent from the more particular description of non-limiting embodiments, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
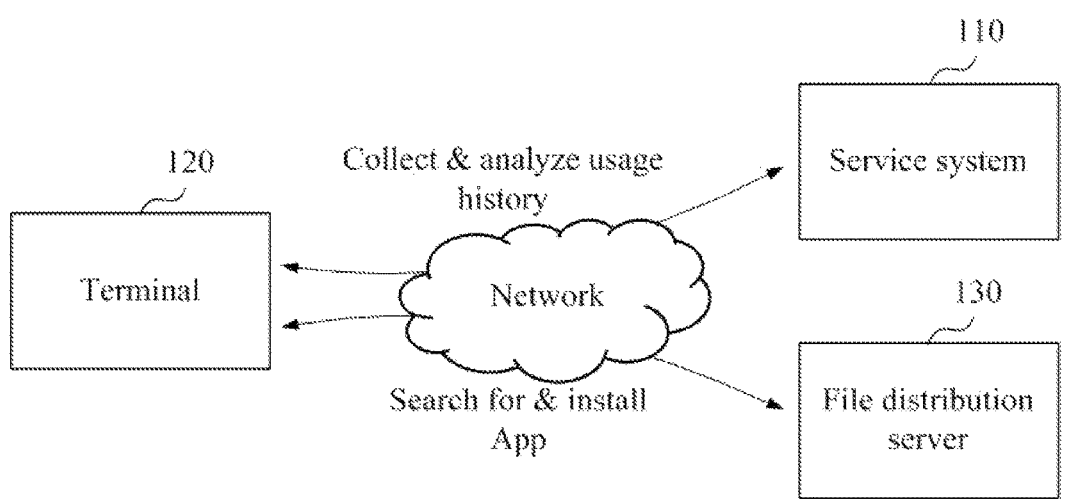
FIG. 1 is a diagram illustrating an example of an operation environment of a system for collecting usage history of a smartphone using a smartphone optimization application (App) according to one example embodiment.

Example embodiments of the present invention will now be described more fully with reference to the accompanying drawings. Example embodiments may, however, be embodied in many different forms and should not be construed as being limited to the embodiments set forth herein; rather, these example embodiments are provided so that this disclosure will be thorough and complete, and will fully convey the scope of the example embodiments to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

FIG. 1 is a diagram illustrating an example of the operation environment of a system for collecting usage history of a smartphone using a smartphone optimization application (App) according to one embodiment. FIG. 1 illustrates a service system 110, a terminal 120, and a file distribution server 130.

The service system 110 may be a server device used for a user to collect and analyze usage history provided from the terminal 120.

The terminal 120 transmits the usage history to the service system 110 over a wired network or a wireless network according to the control of a control application (control App) installed in the terminal 120. The terminal 120 may be a mobile device of the user such as a smartphone or a tablet PC, capable of performing data communication over the wired network or the wireless network.

Although FIG. 1 illustrates a single terminal 120, a single user may use a plurality of terminals and a plurality of users may use a plurality of terminals. In this example, the service system 110 may collect and analyze usage history for each user or each terminal.

The file distribution server 130 may be a server device that provides information about an App and distributes the installation file of the App, such as an application store (Appstore). As another example, the file distribution server 130 may be a server device configured so that a developer of an App or a seller/distributor of the App autonomously distributes the installation file of the App, instead of using an Appstore.

Although FIG. 1 illustrates a single file distribution server 130, a plurality of file distribution servers 130 may be present and the user may obtain information about a desired App or download the installation file of the desired App by optionally connecting to one of a plurality of file distribution systems.

For example, the user may connect to the file distribution server 130 using the terminal 120, may download an installation file of a control App, and may install the control App in the terminal 120. The control App may be a vaccine App including a vaccine function or an optimization App for optimizing the performance of the terminal 120, in order to induce download of the user and to operate on the terminal 120 at all times.

The vaccine App may be an App that searches for a malicious code or recovers a damaged file. The optimization App may be an App that optimizes the performance of the terminal 120 by cleaning the memory of the terminal 120, for example, a smartphone, or by cleaning unnecessary temporary files (temp files) and/or files left after deleting an App. Since the vaccine App or the optimization App operates at the terminal 120 at all times, the vaccine App or the optimization App may be automatically executed in the terminal 120 and may continuously collect usage history in the terminal 120 without a need for the user to directly execute the control App.

Further describing the control App, the control App may include an optimization App that is installed in the terminal 120 and is automatically executed in the terminal 120 for at least one of security enhancement and performance optimization of the terminal 120.

When the control App is executed in the terminal 120, the control App controls the terminal 120 to generate a variety of usage history and to transmit the generated usage history to the service system 110. The variety of usage history may include as follows:

(a) information about an App installed in the terminal 120 of the user;

(b) information about an App operating in the background among Apps installed in the terminal 120 of the user;

(c) information about an App substantially used among Apps installed in the terminal 120 of the user (an App used during a predetermined period of time or used a desired (or alternatively predetermined) number of times;

(d) information about a usage time, execution counts, a time occupancy rate, and/or an execution occupancy rate for each App used by the user;

(e) information about rankings of Apps (for example, App rankings from the first to the tenth based on the time occupancy rate or the execution occupancy rate) used by the user based on a condition (for example, the usage time, the execution counts, the time occupancy rate, and/or the execution occupancy rate for each App); and (f) information about content provided to the user through an App.

The usage history may be transmitted to the service system 110 when the control App is installed in the terminal 120, when the user installs a new App in the terminal 120, or when the user executes the App, or may be periodically transmitted to the service system 110.

For example, when the control App is installed in the terminal 120, information about Apps installed in the terminal 120 of the user may be transmitted to the service system 110 by scanning, by the control App, the Apps installed in the terminal 120. Every time a new App is installed, information about the new App may be transmitted from the terminal 120 to the service system 110 according to the control of the control App.

As another example, irrespective of user execution, information about an App executed in the background may be periodically transmitted from the terminal 120 to the service system 110 according to the control of the control App.

As another example, usage history (c) through (f) may be transmitted from the terminal 120 to the service system 110 according to the control of the control App every time the user executes an App.

In this example, the service system 110 may analyze the collected information and may generate a variety of information associated with the user as follows:

(i) a field of interest of the user verified and stored based on categories of Apps installed by the user and/or contents provided to the user through the Apps;

(ii) information about Apps not executed during a desired (or alternately predetermined) period of time after being installed by the user;

(iii) a list of Apps substantially used by the user at frequent intervals;

(iv) a list of Apps not directly executed by the user, however, executed in the background; and (v) another user that mainly uses Apps included in a list of Apps frequently used by the user and a list of Apps used by the other user.

The service system 110 may further generate information about an App execution intent of the user in addition to a quantitative analysis. For example, information about content provided to the user through an App may be information to verify what the user has done by executing the App or for what the user has executed the App rather than to verify which App is executed by the user.

Due to a relatively high usage risk of a smartphone, many users use a vaccine App or an optimization App. Thus, the control App may be configured based on the vaccine App or the optimization App to induce users to use the control App.

Figure 2:
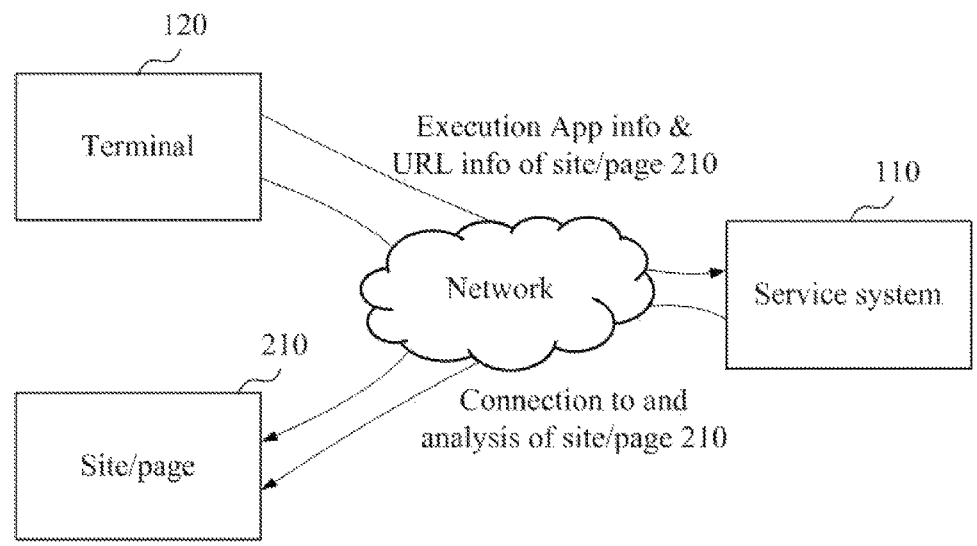
FIG. 2 is a diagram illustrating an example of a process of collecting and analyzing information about an App execution intent of a user according to one example embodiment.

FIG. 2 is a diagram illustrating an example of a process of collecting and analyzing information about an App execution intent of a user according to one embodiment. FIG. 2 illustrates an example in which the user connects to a site/page 210 using a specific App (hereinafter, "App A") executed in the terminal 120.

In this example, a control App installed in the terminal 120 transmits information about executed App A and information about a uniform resource locator (URL) of the site/page 210 to the service system 110. For example, App A may be an App used to connect to an online shopping site. In this example, the terminal 120 may transmit information about App A, and information about the URL of the online shopping site and URLs of pages visited by the user at the online shopping site to the service system 110 according to the control of the control App.

The service system 110 connects to the site/page 210 using the URL of the site/page 210, and verifies information about the intent of the user having executed App A by analyzing the site/page 210.

For example, the service system 110 may analyze a category of the site/page 210 or a type of content included in the site/page 210 through a keyword analysis with respect to a text included in the site/page 210. As another example, the service system 110 may also analyze the site/page 210 using an image/video analysis, for example, image matching or video matching about an image or a video included in the site/page 210.

In an example of the online shopping site, the service system 110 may analyze texts, images, videos, and the like, included in pages visited by the user, and may verify that the user has visited online shopping mall A through App A and had an interest in product B.

An example of the service system 110 having collected and analyzed information about the App execution intent of the user is expressed by Table 1.

TABLE 1

| Date | App name | Connection URL | Content of interest |
|---|---|---|---|
| 20140701 | App A | http://www.aaa.co.kr | Product A |
| 20140707 | App B | http://www.appstore.bbb.com | App D |
| 20140710 | App A | http://www.aaa.co.kr | Product B |
| . . . | . . . | . . . | . . . |

For example, referring to Table 1, the user visited site "https://www.aaa.co.kr" on "Jul. 1, 2014", and used "App A" to receive information about "product A". Also, the user visited site "https://www.appstore.bbb.com" on "Jul. 7, 2014", and used "App B" to receive information about "App D". Such information may be used as information about the intent of the user having executed the Apps.

An example in which the terminal 120 transmits the URL of the site/page 210 to the service system 110 according to the control of the control App, and the service system 110 connects to and analyzes the site/page 210 using the URL is described with reference to FIG. 2.

According to another example embodiment, the terminal 120 may implement a keyword analysis or an image/video analysis with respect to the site/page 210 directly according to the control of the control App, and may transmit an analysis result to the service system 110 together with information about "App A".

For example, the control App may verify in real time an action performed by the user that visits site "https://www.aaa.co.kr", based on information exchanged between "App A" and site "https://www.aaa.co.kr". For example, the control App may verify that the user has visited site "https://www.aaa.co.kr" by executing "App A" and has purchased "product A", and may control the terminal 120 to transmit the verified information to the service system 110. In this example, Table 1 is expressed by Table 2.

TABLE 2

| Date | App name | Connection URL | User action |
|---|---|---|---|
| 20140701 | App A | http://www.aaa.co.kr | Purchase of product A |
| 20140707 | App B | http://www.appstore.bbb.com | Download of App D |
| 20140710 | App A | http://www.aaa.co.kr | Subscription to info about product B |
| . . . | . . . | . . . | . . . |

That is, the service system 110, based on an information received from the terminal 120, analyzes content that the user has shown an interest by executing an App and also analyzes an action performed by the user in association with the content.

Figure 3:
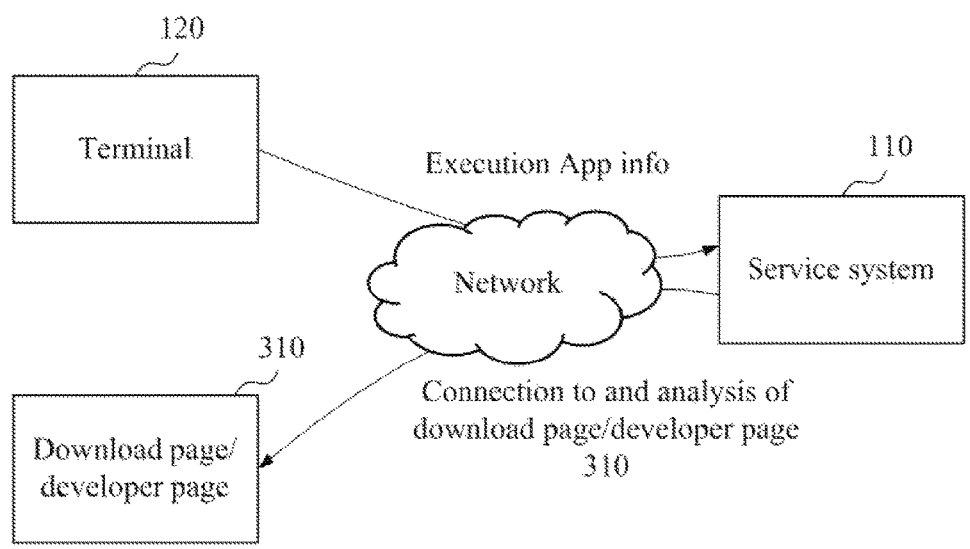
FIG. 3 is a diagram illustrating another example of a process of collecting and analyzing information about an App execution intent of a user according to one example embodiment.

FIG. 3 is a diagram illustrating another example of a process of collecting and analyzing information about an App execution intent of a user according to one embodiment. FIG. 3 illustrates an example in which the user executes a specific App (hereinafter "App E") in the terminal 120.

In this example, a control App installed in the terminal 120 transmits information about executed App E to the service system 110.

The service system 110 obtains information about content provided through App E by connecting to a download page and/or developer page 310 of App E based on information about executed App E. The service system 110 analyzes information about the intent of the user having executed App E based on the obtained information.

For example, the service system 110 may obtain information about App E by connecting to the download page and/or developer page 310 of App E based on information about App E collected from the terminal 120. For example, the service system 110 may obtain information about contents provided from App E based on a keyword analysis or an image/video analysis with respect to the download page and/or developer page 310, and may obtain information about execution intent in association with content to be obtained by the user by executing App E.

An example of the service system 110 having collected and analyzed information about the App execution intent of the user is expressed by Table 3.

TABLE 3

| Date | App name | Download/developer page | Content of interest |
|---|---|---|---|
| 20140702 | App E | http://www.eee.com | Game E |
| 20140706 | App E | http://www.eee.com | Game E |
| 20140707 | App B | http://www.fff.co.kr | Appstore B |
| . . . | . . . | . . . | . . . |

As described above, the service system 110 may also analyze information about the intent of the user having executed a corresponding App by receiving information about the App executed by the user and by collecting information about the App at a site associated with the App.

Figure 4:
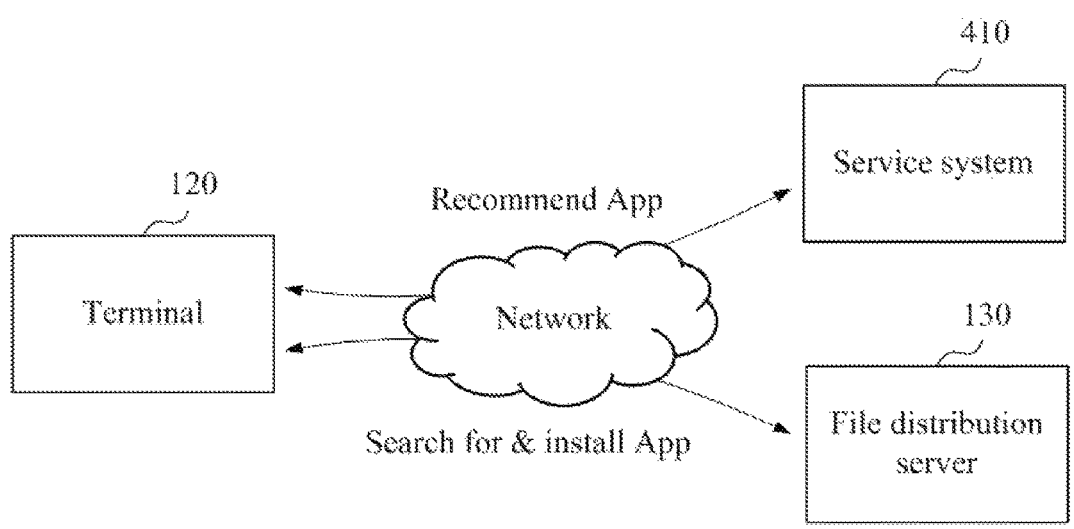
FIG. 4 is a diagram illustrating an example of an operation environment of a system for recommending an App to a user according to one example embodiment.

FIG. 4 is a diagram illustrating an example of an operation environment of a system for recommending an App to a user according to one embodiment. Referring to FIG. 4, a service system 410 may refer to a server device that recommends an App to the user based on information analyzed based on usage history. The service system 410 may be a system that includes the service system 110 described above with reference to FIGS. 1 through 3, or receives and uses an analysis result through communication with the service system 110.

The service system 410 determines an App to recommend to the user based on an App substantially used by the user at frequent intervals, a site or a page frequently visited by the user, or favorite content of the user.

The user may search the file distribution server 130 for the recommended App and may install the found App.

As described above, in an existing Appstore, Apps are recommended to users based on download counts of an App, a correlation with an existing App downloaded by a user, reviews, and ratings. However, the download counts may be insignificant since 90% or more of Apps downloaded by users are downloaded once or less. The correlation between Apps is also insignificant with respect to an App that is not used. In addition, various abusing methods are known in association with the reviews or the ratings and thus, it is difficult to identify a review or a rating of a genuine user.

On the contrary, the service system 410 recommends an App based on an App substantially used by the user at frequent intervals or a favorite site/page/content of the user and thus, may recommend an App having a substantially high correlation to the user. From view of the user, the user may receive a recommendation on an App fit for the user and conveniently use the recommended App among Apps that are developed and distributed.

Also, from view of App developers or App sellers according to the related art, there is a need to verify an App that is being substantially used and a usage frequency of the App for each country and/or for each target user as well as given information. For example, when developing a new App, specific data may be required to determine a business value. However, the Appstore according to the related art provides only information about rankings for each App market or for each App or provides download rankings for each section. Accordingly, the App developers or the App sellers determine the business value at a level of using subjective data such as recollection-based answers of users through a separate survey.

On the contrary, according to one example embodiment, App developers or App sellers may obtain objective information about Apps that are substantially used by users at frequent intervals.

Accordingly, when App developers are to develop new Apps or when App sellers are to launch newly developed Apps, the App developers or the App sellers may accurately determine business values of the Apps to be developed or launched by precisely determining the intent or purpose of the users to use the Apps.

Hereinafter, a system for providing a research service about terminal usage history of users based on accumulated data will be described. The research service may be based on a reward to be provided to the users.

Figure 5:
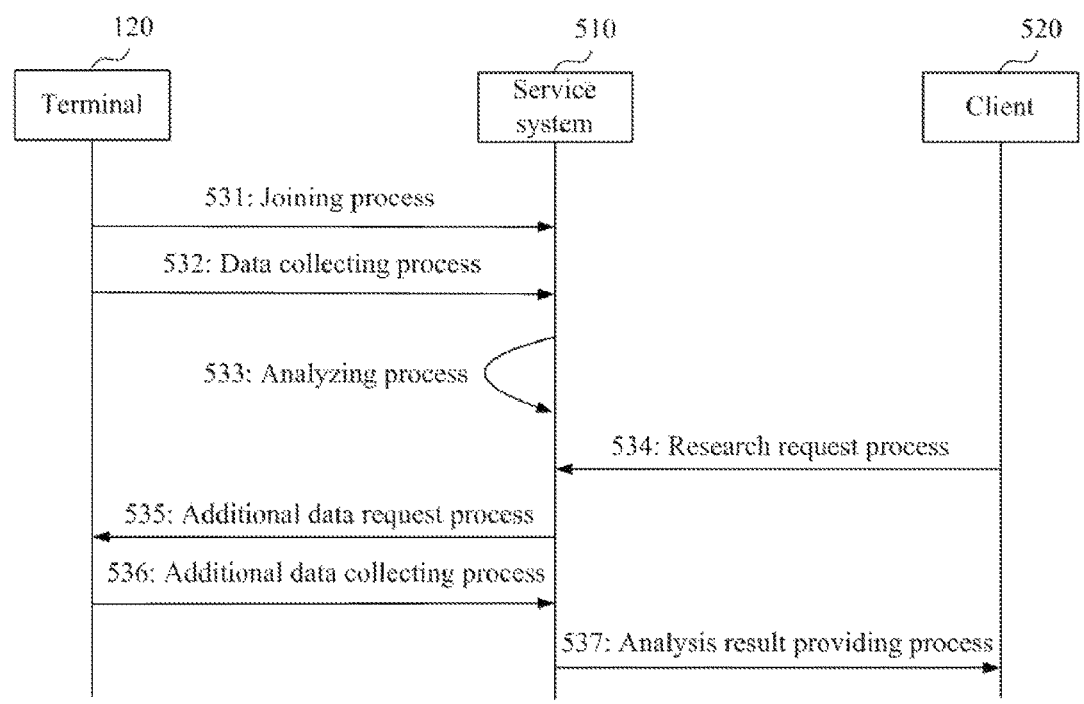
FIG. 5 illustrates an example of a research service process of a research system according to one embodiment.

FIG. 5 illustrates an example of a research service process of a research system according to one embodiment. Referring to FIG. 5, a service system 510 may refer to a server device that includes the service system 110 or the service system 410 described above with reference to FIGS. 1 through 4, or receives and uses information such as an analysis result of usage history or a result of recommending an App through communication with the service system 110 or the service system 410.

In a joining process 531, a user may join a reward program provided from the service system 510 through the terminal 120. Here, at the event of joining the reward program, the user inputs the following information after an agreement to join the reward program, and the service system 510 stores and manages the input information in association with the user.

Member information indicates demo information such as age, gender, and region.

Social service interaction indicates an interaction with an existing social network service (SNS) of the user.

Additional input information indicates information required by a company, such as a field of interest of the user.

In a data collecting process 532, a control App installed in the terminal 120 controls the terminal 120 to transmit information, for example, an App executed by the user, a list of pages visited by the user, to the service system 510.

For example, when the user executes a specific App or when the user visits a site or a page, the terminal 120 may frequently transmit information about the executed App or information about the site or the page visited by the user to the service system 510 according to the control of the control App. As another example, the terminal 120 may collect information about the executed App or information about the visited site/page and may periodically transmit the collected information to the service system 510.

Also, to protect personal information of the user, the terminal 120 may remove personal information such as personal identification information and may include information indicating a demo characteristic and anonymously transmit the information according to the control of the control App. For example, information indicating a demo characteristic may include classification information for characterizing the user without using personal information of the user, such as a "male office worker in twenties and living in Seoul" or a "female in thirties". The demo characteristic may be generated based on information input from the user in the joining process 531.

When transmitting data according to the control of the control App, the terminal 120 may also transmit location information in addition to an App usage or web visit history. For example, the terminal 120 may transmit, to the service system 510, information about the time at which the user executed the App and information about the location of the terminal 120 at the time.

When transmitting data according to the control of the control App in association with an App interacted by the user with an account, the terminal 120 may also transmit activity information in the interacted App. For example, when the user executes an SNS App, the terminal 120 may transmit activity information of the user such as comments and like at an SNS to the service system 510.

In an analyzing process 533, the service system 510 groups target customers based on the collected data. For example, the service system 510 may classify users based on data, such as age, gender, region, academic background, income, an owned vehicle, residential environment, and a field of interest, input or collected from the users. As an example, the service system 510 may obtain information about Apps frequently used by users corresponding to a condition by classifying the users based on a variety of conditions, such as a "male office worker in mid-thirties and with an information technology (IT) business", a "female office worker in mid-thirties and with an IT business", and a "housewife in mid-thirties".

In a research request process 534, the service system 510 receives a research request from a client 520. Here, a condition requested by the client 520 may be set in the service system 510. For example, the client 520 may request the service system 510 to intensively analyze data about a specific user group, for example, "college students in twenties".

In an additional data request process 535, the service system 510 requests users of a specific user group requested by the client 520 for additional data. For example, when the client 520 requests an intensive analysis about a user group including "college students in twenties", the service system 510 may request the terminals 120 of users corresponding to the "college students in twenties" for data about further various conditions.

In an additional data collecting process 536, a control App installed in the terminal 120 controls the terminal 120 to further transmit data corresponding to the added condition to the service system 510.

In an analysis result providing process 537, the service system 510 provides the collected various information to the client 520.

The service system 510 may further perform a process for providing a reward in addition to the processes of FIG. 5. For example, the service system 510 may provide a preset reward to users having installed the control App and joined the research program. For example, the reward may be provided in a form of mileage. In this example, the service system 510 may provide a predetermined mileage to users in response to the users that join the research program. Alternatively, separate from the preset welcome reserve provided at the event of joining the research program, the service system 510 may provide a predetermined mileage to users in response to data being transmitted from the users. Also, as in the additional data request process 535, the service system 510 may provide a relatively large mileage to designated users in response to a research request of the client 520.

Conditions for collecting additional data may be variously set as follows:

(1) Target user characteristic: The service system 510 may collect additional data from target users corresponding to a characteristic requested by the client 520 among various characteristics including age, gender, region, academic background, income, an owned vehicle, residential environment, and a field of interest. For example, when the client 520 requests an intensive analysis about a characteristic "males in late twenties and living in Seoul", the service system 510 may collect additional data from target users classified into the characteristic "males in late twenties and living in Seoul".

(2) For each time zone: The service system 510 may collect, as additional data, information about smartphone usage history in a specific time zone of a target user, such as morning time, lunchtime, evening time, business hours, rush hour, and a specific broadcast time, for example, date/time targeting for broadcasting a world cup game and a soap opera.

(3) For each usage circumstance: The service system 510 may collect additional data from a target user in a specific circumstance, for example, a situation in which an App unused for a relatively long time is executed, a situation in which a user simultaneously uses a plurality of Apps, and a situation in which a single App is in use during a desired (or alternatively predetermined) period of time.

(4) For each place: The service system 510 may collect, from target users, additional data about an App usage for each place, such as information about a place at which a user generally stays, for example, an office during the day and a home at night, information about an App frequently used at each place, and an App generally used when the user leaves each place.

(5) Others: The service system 510 may collect, from a target user as additional information, information about an installation of a specific App, for example, an App of a competing company requested from the client 520 and execution counts indicating the number of times that the specific App is executed, or may collect additional data based on a situation of a terminal of the target user, for example, a situation in which the specific App is installed, a situation in which the specific App is executed a preset number of times or more, a situation in which the specific App is in an idle state, a situation in which tasks are simultaneously performed, and a situation in which the remaining battery amount is less than or equal to a preset % value.

As described above, when a situation of a user or a terminal of the user fits a data collection condition, the service system 510 may collect data and may provide the user with a reward, for example, providing a predetermined mileage. In this example, the service system 510 may determine a priority based on an optimal target user condition for each target user group and may provide a reward based on the priority within the total budget limit preset for an individual research request.

Irrespective of making an additional effort, the user may receive a reward by joining a reward program through a control App that includes a vaccine function or an optimization function. Thus, the service system 510 may induce users to use the control App and may variously analyze and use the smartphone usage history of the users.

Further, in response to downloading an App of the client 520 or providing data for analysis, the service system 510 may provide an additional reward to a key customer identified based on an analysis result.

The service system 510 may collect user feedback by pushing an alert to a user having installed an App of the client 520 or an App desired by the client 520 for analysis and having used the App during at least a desired (or alternatively predetermined) period of time through the control App, and may provide an additional reward based on the collected user feedback.

In this example, the service system 510 may track and observe the user feedback about the App of the client 520 or the App desired by the client 520 for analysis and after-feedback retention such as additional usage. Also, the service system 510 may provide the client 520 with an analysis result about users, feedback of the users, and a result of tracking and observing the App of the client 520 or the App desired by the client 520 for analysis.

Also, the service system 510 may calculate the answer reliability of each user based on the result of tracking and observing the user feedback and the after-feedback retention, and may apply the calculated answer reliability to coordinate the priority of a target user.

Figure 6:
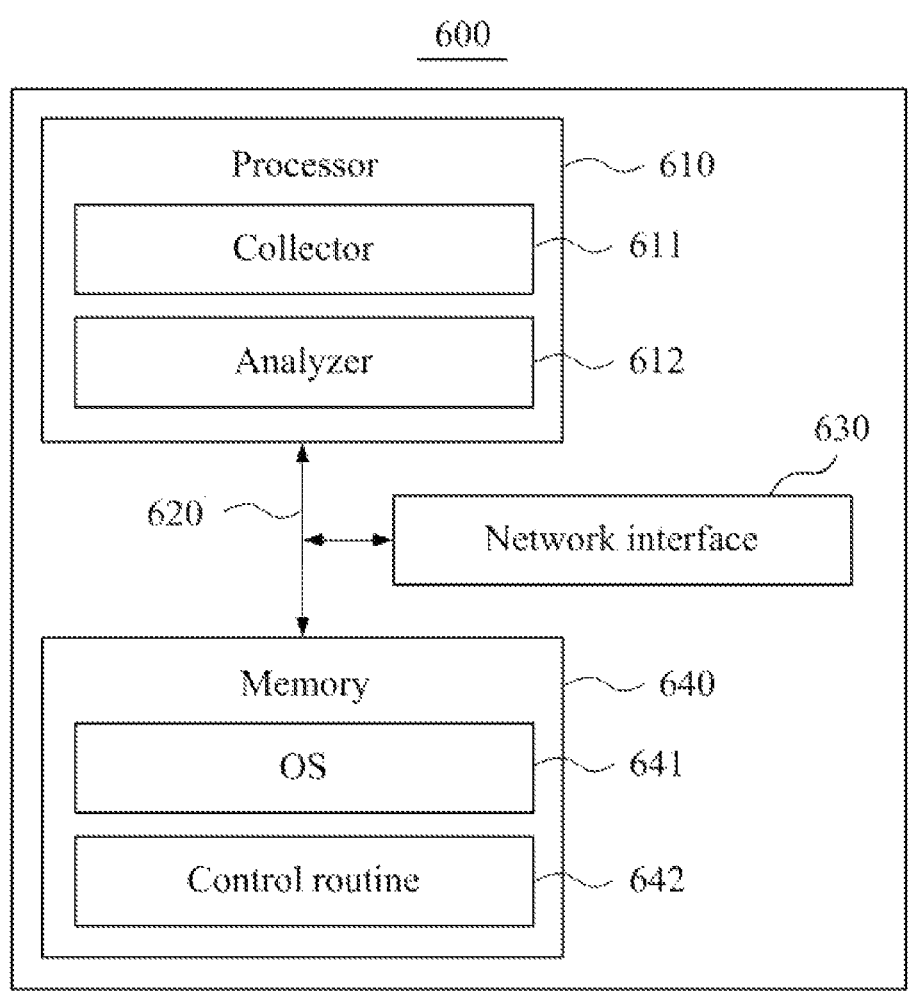
FIG. 6 is a block diagram illustrating a configuration of a service system according to one example embodiment.
Figure 7:
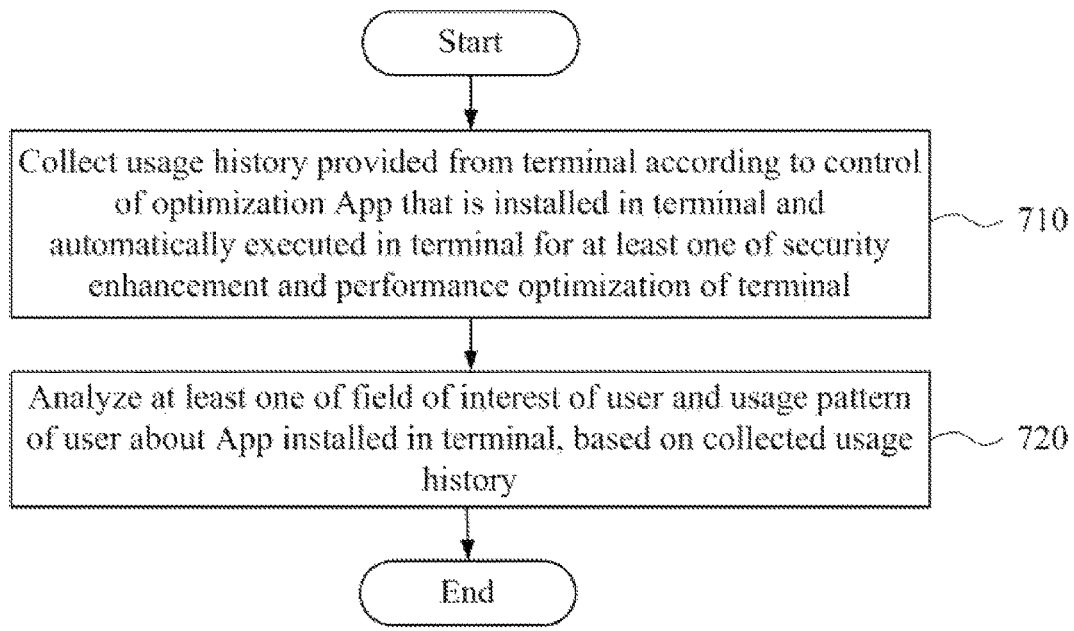
FIG. 7 is a flowchart illustrating an example of a control method of a service system according to one embodiment.

FIG. 6 is a block diagram illustrating a configuration of a service system according to an example embodiment, and FIG. 7 is a flowchart illustrating an example of a control method of a service system according to an embodiment of the present invention.

A service system 600 of FIG. 6 corresponds to the service system 110 described above with reference to FIGS. 1 through 3. Referring to FIG. 6, the service system 600 includes a processor 610, a bus 620, a network interface 630, and a memory 640. The memory 640 may include an operating system (OS) 641 and a control routine 642. The processor 610 includes a collector 611 and an analyzer 612. According to other example embodiments, the service system 600 may include more number of constituent elements than the number of constituent elements of FIG. 6. However, many constituent elements according to the related art do not need to be clearly illustrated. The service system 600 may include other constituent elements such as a display or a transceiver.

The memory 640 includes a permanent mass storage device, such as a random access memory (RAM), a real only memory (ROM), or a disc drive, as a computer-readable storage medium. Also, program codes for the OS 641 and the control routine 642, and the like, may be stored in the memory 640. Such software constituent elements may be loaded from another computer-readable storage medium separate from the memory 640 using a drive mechanism (not shown). The other computer-readable storage medium may include, for example, a floppy drive, a disc, a tape, a DVD/CD-ROM drive, and a memory card. Software constituent elements may be loaded to the memory 640 through the network interface 630 instead of using the computer-readable storage medium. For example, the control routine 642 may be loaded to the memory 640 based on a program installed by files provided from developers over a network.

The bus 620 enables communication and data transmission between the constituent elements of the service system 600. The bus 620 may be configured using a high-speed serial bus, a parallel bus, a storage area network (SAN), and/or another appropriate communication technology.

The network interface 630 is a computer hardware constituent element for connecting the service system 600 to the computer network. The network interface 630 may connect the service system 600 to the computer network through a wireless or wired connection.

The processor 610 is configured to process computer-readable instructions of a computer program by performing basic calculations, logic, and input/output operations of the service system 600. The computer-readable instructions may be provided from the memory 640 or the network interface 630 to the processor 610 through the bus 620. The collector 611 and the analyzer 612 of processor 610 may be configured to execute program codes stored in a storage device such as the memory 640 by way of, for example, the control routine 642 to perform operations 710 and 720 of FIG. 7.

In operation 710, the collector 611 may collect usage history provided from the terminal 120 according to the control of an optimization App that is installed in the terminal, and automatically executed in the terminal for at least one of a security enhancement and performance optimization of the terminal.

For example, the usage history may include information about at least one of a category of the App installed in the terminal, an execution time indicating a duration of time in which the App is executed in the terminal, execution counts indicating the number of times that the App is executed in the terminal, an execution time occupancy rate, and an execution count occupancy rate, and information about an App automatically executed in the background irrespective of an input of the user.

As another example, the usage history may include information about content executed by executing, by the user, the App. Here, information about the content may be determined based on at least one of keyword analysis, image matching, and video matching with respect to information included in the content. Information about the content may include, as an example, at least one of information about content included in a site or a page connected through the App. As another example, information about the content may include information about a download page of the App or a page provided from a developer of the App. Examples of information about the content are described with reference to FIGS. 2 and 3 and thus, a further description related thereto will be omitted here.

As another example, the usage history may include at least one of information input from the user through a user interface provided from the App and information transferred to the terminal from a service server that provides a service to the App. Here, the service server may be a server device that provides a game service as a game App. For example, information about a keyword input from the user using a search portable App and a search result provided at a search portable App in response to the keyword may be provided as the usage history.

In operation 720, the analyzer 612 analyzes at least one of a field of interest of the user and a usage pattern of the user about an App installed in the terminal, based on the collected usage history. Here, the service system 600 analyzes the actual usage pattern about an App instead of using whether the App is installed, and analyzes a substantial field of interest of the user by applying information about the App and information about content provided to the user through the App.

In an alternate embodiment, collecting of the usage information and analyzing of the field of interest and the usage pattern of the user is performed at the terminal according to the control of the optimization App. In this case, the service system 600 would correspond to the terminal 120.

Figure 8:
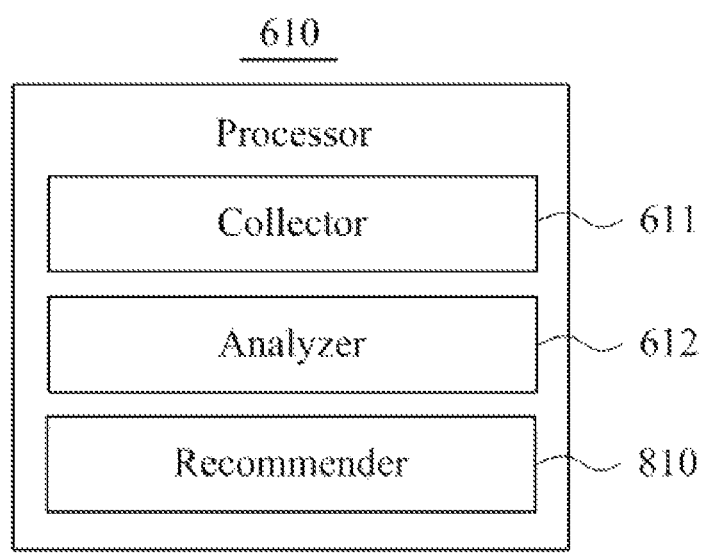
FIG. 8 is a block diagram illustrating a configuration of a service system for recommending another App to a user according to one example embodiment.
Figure 9:
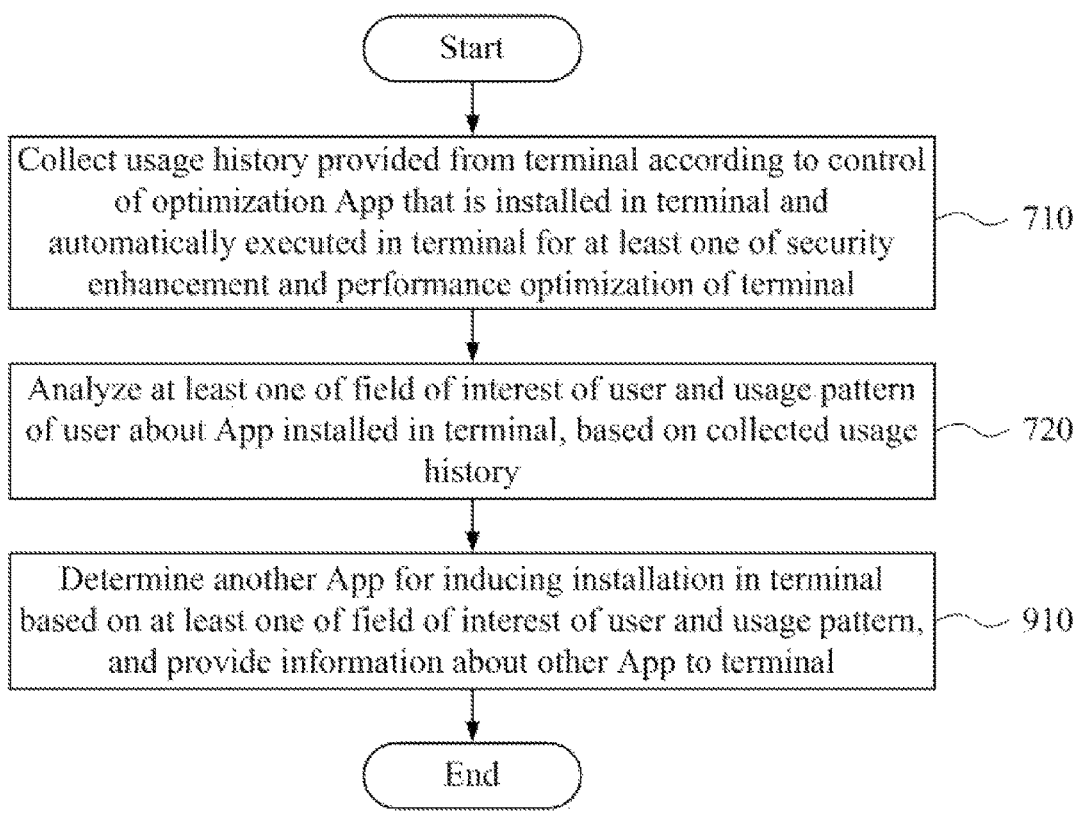
FIG. 9 is a flowchart illustrating another example of a control method of a service system according to one embodiment.

FIG. 8 is a block diagram illustrating a configuration of a service system for recommending an App to a user according to one example embodiment, and FIG. 9 is a flowchart illustrating a control method of a service system according to an example embodiment.

Referring to FIG. 8, the service system 600 described above with reference to FIGS. 6 and 7 further includes a recommender 810 in the processor 610. In this embodiment, the control routine 642 in the memory 640 of the service system 600 (shown in FIG. 6) may further include program codes for the recommender 810. The recommender 810 may be configured to execute the program codes to perform operation 910 of FIG. 9.

In operation 910, the recommender 810 determines another App that is to be installed in the terminal 120 based on at least one of the field of interest of the user and the usage pattern, and provides information about the App to the terminal. For example, the recommender 810 may recommend another App based on an App substantially used by the user at frequent intervals or may recommend another App based on content frequently used by the user, for example, a site/page frequently visited by the user.

For example, as described above, the usage history may include information about at least one of execution time, execution counts, the execution time occupancy rate, and the execution count occupancy rate of the App. Here, the analyzer 612 may generate information about usage rankings of Apps of the user based on at least one of execution time, execution counts, the execution time occupancy rate, and the execution count occupancy rate of the App, and may analyze the usage pattern based on information about the usage rankings. In this example, the recommender 810 may verify an App frequently used by the user based on the usage pattern that is analyzed based on information about the usage rankings, and may recommend another App associated with the verified App to the user.

As another example, the usage history may include information about content executed by executing the App. The field of interest of the user may be determined based on information about the content. For example, the analyzer 612 may analyze the field of interest of the user based on the type of the App, such as a selectively available App, and information about the content executed by executing the App. Here, the recommender 810 may recommend another App associated with the determined field of interest of the user to the user.

Figure 10:
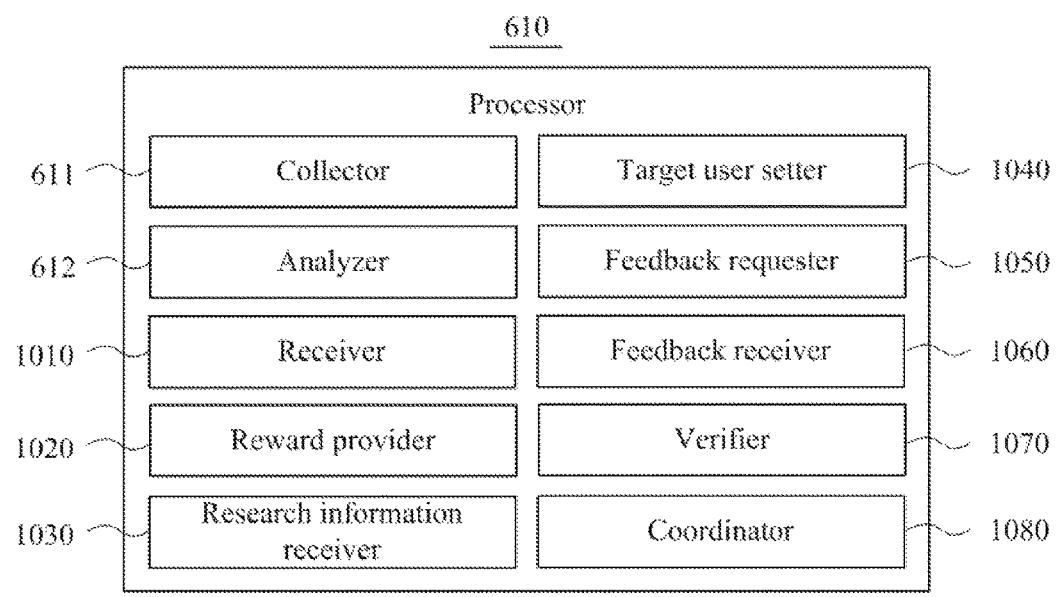
FIG. 10 is a block diagram illustrating a configuration of a service system for a research service according to one example embodiment.
Figure 11:
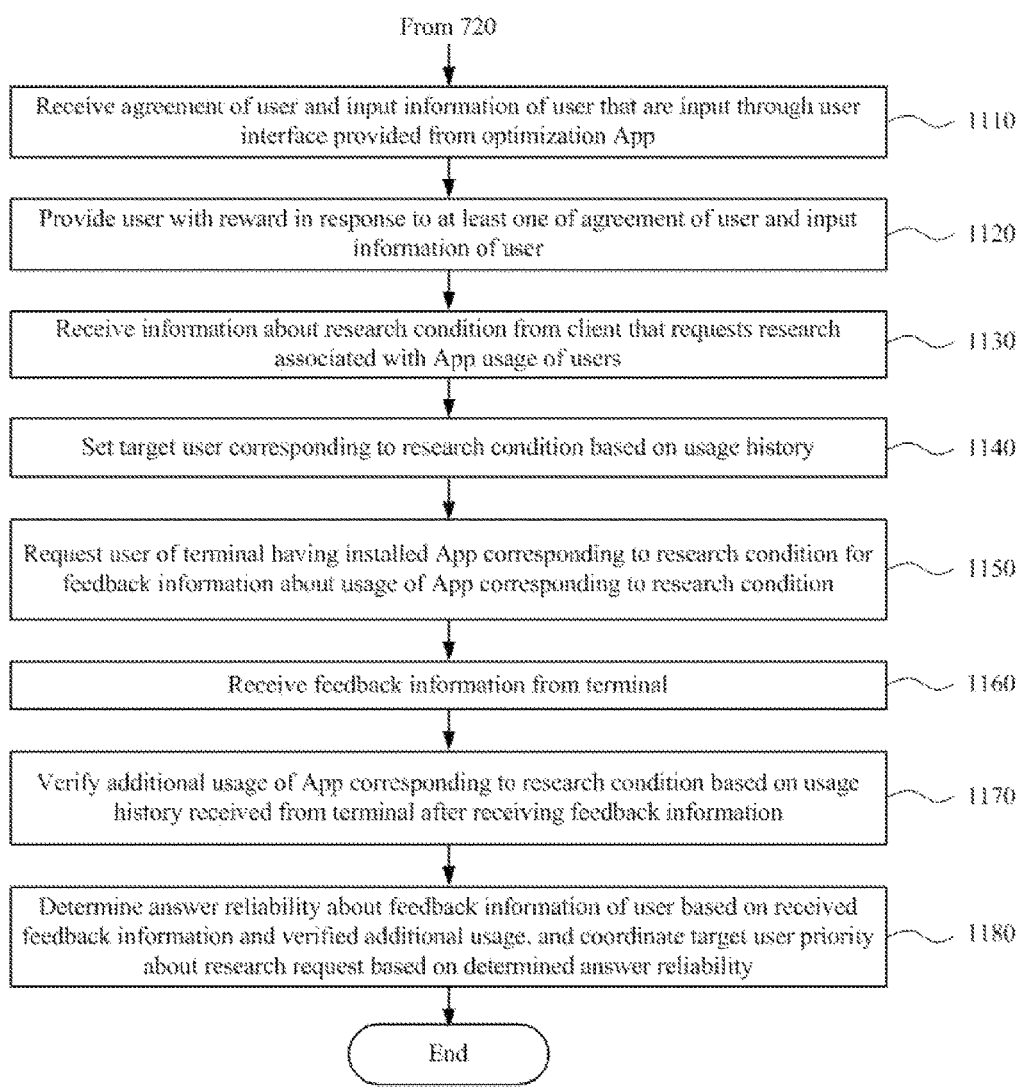
FIG. 11 is a flowchart illustrating still another example of a control method of a service system according to one embodiment.

FIG. 10 is a block diagram illustrating a configuration of a service system for a research service according to an example embodiment, and FIG. 11 is a flowchart illustrating still another example of a control method of a service system according to one embodiment.

Referring to FIG. 10, the service system 600 described above with reference to FIGS. 6 and 7 may further include, in the processor 610, a receiver 1010, a reward provider 1020, a research information receiver 1030, a target user setter 1040, a feedback requester 1050, a feedback receiver 1060, a verifier 1070, and a coordinator 1080. Here, the control routine 642 in the memory 640 of the service system 600 (see FIG. 6) may further include program codes for the receiver 1010, the reward provider 1020, the research information receiver 1030, the target user setter 1040, the feedback requester 1050, the feedback receiver 1060, the verifier 1070, and the coordinator 1080. Here, the receiver 1010, the reward provider 1020, the research information receiver 1030, the target user setter 1040, the feedback requester 1050, the feedback receiver 1060, the verifier 1070, and the coordinator 1080 may be configured to execute the program codes to perform operations 1110 through 1180 of FIG. 11.

In operation 1110, the receiver 1010 receives the agreement of the user and the input information of the user that are input through a user interface provided from an optimization App.

For example, the input information of the user may include information about at least one of age, gender, region, academic background, income, an owned vehicle, and residential environment, and information about a field of interest of the user. Information about the field of interest of the user may be selected from among preset items based on a field of interest of a client.

The input information of the user may include interaction information with an SNS joined by the user.

In operation 1120, the reward provider 1020 provides the user with a reward in response to at least one of the agreement of the user and the input information of the user. The reward provider 1020 may also provide the user with a reward, for example mileage, virtual item, etc., in response to receiving the usage history.

In operation 1130, the research information receiver 1030 receives information about a research condition from a client that requests a research associated with an App usage of users. For example, the client may request the service system 600 for a research according to various research conditions, such as specific users, for example, male office workers in thirties, users using a specific App, or Apps frequently used in a specific time zone.

In operation 1140, the target user setter 1040 sets a target user corresponding to the research condition based on the usage history. Here, when the user is the target user corresponding to the research condition or when the usage history provided from the terminal of the user corresponds to the research condition, the reward provider 1020 may provide the reward to the user.

In operation 1150, the feedback requester 1050 requests the user of the terminal having installed an App corresponding to the research condition for feedback information about the usage of the App corresponding to the research condition. For example, the feedback requester 1050 may request users having installed an App requested by the client to answer questions about the App. In response to receiving the feedback, the reward provider 1020 may provide a reward to the users that provide the feedback in response to the feedback request.

In operation 1160, the feedback receiver 1060 receives feedback information from the terminal 120. The feedback information may be provided to and used by the client.

In operation 1170, the verifier 1070 verifies an additional usage of the App corresponding to the research condition based on the usage history received from the terminal 120 after receiving the feedback information. For example, the verifier 1070 may verify whether the user additionally uses an App corresponding to a research condition in order to verify whether the user is using the App based on content of the feedback information and thereby may verify the reliability about the feedback of the users.

In operation 1180, the coordinator 1080 determines an answer reliability about the feedback information of the user based on the received feedback information and the verified additional usage, and coordinates a target user priority about the research request based on the determined answer reliability.

For example, when a user having replied that the user frequently uses the App through feedback information is not verified to additionally use the App, the reliability about the feedback of the user may be set to be relatively low. In this example, the priority of the user for a research request may also be lowered.

On the contrary, when a user having replied that the user frequently uses the App through feedback information is verified to continuously use the App, the reliability about the feedback of the user may be set to be relatively high. In this example, the priority of the user for a research request may be raised.

According to other example embodiments, the service system 600 may be configured through various combinations of constituent elements described above with reference to FIGS. 6 through 11. According to some example embodiments, the service system 600 may include the processor 610 that includes the collector 611 and the analyzer 612 of FIG. 6 and the reward provider 1020 of FIG. 10. According to other example embodiments, the service system 600 may include the processor 610 that includes the collector 611 and the analyzer 612 of FIG. 6 and the recommender 810 of FIG. 8. The control App may be configured based on the vaccine App or the optimization App, and may also be configured based on a separate analysis/recommendation/research App.

According to some example embodiments, it is possible to collect terminal usage history of a user using an optimization tool installed in a terminal of the user capable of installing and using an App, such as a smartphone. Also, it is possible to analyze an App frequently used by a user based on a circumstance by verifying quantitative information based on collected usage history and by verifying an App executed or used by the user based on time, place, and occasion. Also, it is possible to recommend another App to a user based on an App frequently used by the user based on a circumstance. Also, it is possible to provide a research service about terminal usage history of a user based on a reward.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A service system in communication through a network with a remote terminal having at least an optimization application installed therein, the service system comprising:
   a processor; and
   a memory,
   wherein the processor comprises:
   a collector configured to continually collect usage history of at least one other application installed in the remote terminal and transmitted from the remote terminal,
   wherein the collected usage history of the at least one other application is generated by the optimization application installed in the remote terminal when the optimization application automatically executes at least one of a security enhancement and a performance optimization of the remote terminal; and
   an analyzer configured to analyze at least one of a field of interest of a user and a usage pattern of the user about the at least one other application installed in the remote terminal, based on the collected usage history transmitted from the remote terminal.

2. The service system of claim 1, wherein the usage history comprises information about at least one of a category of the at least one other application installed in the remote terminal, an execution time indicating a duration of time in which the at least one other application is executed in the remote terminal, execution counts indicating the number of times that the at least one other application is executed in the remote terminal, an execution time occupancy rate, and an execution count occupancy rate, and information about an application automatically executed in a background irrespective of an input of the user among the at least one other application.

3. The service system of claim 1, wherein the usage history comprises information about content executed by executing, by the user, the at least one other application, and information about the content is determined based on at least one of a keyword analysis, an image matching, and a video matching with respect to information included in the content.

4. The service system of claim 3, wherein information about the content comprises at least one of information about content included in a site or a page connected through the at least one other application and information about a download page of the at least one other application or a page provided from a developer of the at least one other application.

5. The service system of claim 1, wherein the usage history comprises at least one of information input from the user through a user interface provided from the at least one other application and information transferred to the remote terminal from a service server that provides a service to the at least one other application.

6. The service system of claim 1, further comprising:
   a recommender configured to determine another application that is to be installed in the remote terminal based on at least one of the field of interest of the user and the usage pattern, and to provide information about another application to the remote terminal.

7. The service system of claim 1, wherein the analyzer is further configured to generate information about usage a ranking of the at least one other application of the user based on at least one of an execution time, execution counts, an execution time occupancy rate, and an execution count occupancy rate of the at least one other application, and to analyze the usage pattern based on information about the usage rankings.

8. The service system of claim 1, wherein the analyzer is further configured to analyze the field of interest of the user based on a type of the at least one other application and information about content executed by executing the at least one other application.

9. A service system in communication through a network with a plurality of remote terminals each having an optimization application installed therein, the service system comprising:
   a processor; and
   a memory,
   wherein the processor comprises:
   a receiver configured to receive an agreement of a user from a remote terminal to join a research program, and input information of the user from the remote terminal according to a control of the optimization application that is installed in the remote terminal and automatically executed in the remote terminal for at least one of a security enhancement and a performance optimization of the remote terminal;
   a collector configured to continually collect usage history about at least one other application installed in the remote terminal, the collected usage history being provided from the remote terminal according to the control of the optimization application when the optimization application automatically executes at least one of the security enhancement and the performance optimization of the remote terminal; and
   a reward provider configured to provide a reward to the user in response to receiving at least one of the agreement, the input information, and the usage history.

10. The service system of claim 9, wherein the receiver is further configured to receive the agreement of the user and the input information of the user that are input through a user interface provided from the optimization application, and the input information of the user comprises information about at least one of age, gender, region, academic background, income, a vehicle owned, and residential environment, information about a field of interest of the user, and interaction information with a social network service (SNS) joined by the user.

11. The service system of claim 10, wherein the reward provider is further configured to provide at least one of a first reward in response to receiving the agreement of the user and the input information of the user and a second reward in response to receiving the usage history.

12. The service system of claim 9, wherein the processor further comprises:
a research information receiver configured to receive information about a research condition from a client that requests a research associated with an application usage of users; and
a target user setter configured to set a target user corresponding to the research condition based on the usage history,
wherein the reward provider is further configured to provide the reward to the user when the user is the target user corresponding to the research condition or when the usage history provided from the remote terminal of the user corresponds to the research condition.

13. The service system of claim 9, wherein the processor further comprises:
a research information receiver configured to receive information about a research condition from a client that requests a research associated with an application usage of users; and
a feedback requester configured to request the user of the remote terminal having installed an application corresponding to the research condition for feedback information about a usage of the application corresponding to the research condition using the optimization application,
wherein the reward provider is further configured to provide the reward in response to receiving the feedback information.

14. The service system of claim 13, wherein the processor further comprises:
a feedback receiver configured to receive the feedback information from the remote terminal;
a verifier configured to verify an additional usage of the application corresponding to the research condition based on the usage history received from the remote terminal after receiving the feedback information; and
a coordinator configured to determine an answer reliability about the feedback information of the user based on the received feedback information and the verified additional usage, and to coordinate a target user priority about the research request based on the determined answer reliability.

15. A service system in communication through a network with a remote terminal having an optimization application installed therein, the service system comprising:

a processor; and
a memory,
wherein the processor comprises:
a collector configured to continually collect usage history of at least one other application transmitted from the remote terminal through the network, wherein the collected usage history of the at least one other application is generated by the optimization application installed in the remote terminal when the optimization application automatically executes at least one of a security enhancement and a performance optimization of the remote terminal;
an analyzer configured to analyze at least one of a field of interest of a user of the remote terminal and a usage pattern of the at least one application installed in the remote terminal based on the usage history; and
a recommender configured to determine another application that is to be installed in the remote terminal based on the field of interest of a user of the remote terminal and the usage pattern, and to provide information about the another application to the remote terminal through the network.

16. The service system of claim 15, wherein the analyzer is further configured to analyze the field of interest of the user based on information about content executed by executing the at least one application.

17. The service system of claim 15, wherein the usage history comprises information about at least one of a category of the at least one application, an execution time indicating a duration of time in which the at least one application is executed in the remote terminal, execution counts indicating the number of times that the at least one application is executed in the remote terminal, an execution time occupancy rate, and an execution count occupancy rate, and information about an application automatically executed in a background irrespective of an input of the user among the at least one application.

18. The service system of claim 15, wherein the usage history comprises information about content executed by executing, by the user, the at least one application, and
information about the content is determined based on at least one of a keyword analysis, an image matching, and a video matching with respect to information included in the content.

19. The service system of claim 18, wherein information about the content comprises at least one of information about content included in a site or a page connected through the at least one application and information about a download page of the at least one application or a page provided from a developer of the at least one application.

20. The service system of claim 15, wherein the usage history comprises at least one of information input from the user through a user interface provided from the at least one application and information transferred to the remote terminal from a service server that provides a service to the at least one application.

* * * * *